(12) United States Patent
Gerling

(10) Patent No.: US 9,960,852 B2
(45) Date of Patent: May 1, 2018

(54) DEVICE FOR DATA TRANSMISSION

(71) Applicant: Lantiq Beteiligungs-GmbH & Co.KG, Neubiberg (DE)

(72) Inventor: Michael Gerling, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 57 days.

(21) Appl. No.: 15/050,492

(22) Filed: Feb. 23, 2016

(65) Prior Publication Data

US 2016/0248514 A1 Aug. 25, 2016

(30) Foreign Application Priority Data

Feb. 24, 2015 (DE) .................... 20 2015 100 868 U

(51) Int. Cl.
*H04B 10/40* (2013.01)
*H04M 11/06* (2006.01)

(52) U.S. Cl.
CPC .......... *H04B 10/40* (2013.01); *H04M 11/062* (2013.01)

(58) Field of Classification Search
CPC .......... H04B 10/25753; H04B 10/1125; H04B 10/25752; H04B 10/25759; H04B 10/40; H04M 11/062; H04W 88/085
See application file for complete search history.

(56) References Cited

U.S. PATENT DOCUMENTS

| | | | |
|---|---|---|---|
| 6,876,838 B1 | 4/2005 | Daly et al. | |
| 7,049,937 B1* | 5/2006 | Zweig | H01R 13/641 |
| | | | 324/66 |
| 2005/0196119 A1 | 9/2005 | Popovic et al. | |
| 2006/0209886 A1 | 9/2006 | Silberman et al. | |
| 2007/0224859 A1 | 9/2007 | Sasser et al. | |
| 2016/0241293 A1* | 8/2016 | Huang | H04B 1/40 |

FOREIGN PATENT DOCUMENTS

| | | |
|---|---|---|
| CN | 204130834 U | 1/2015 |
| WO | 2011106761 A1 | 9/2011 |

* cited by examiner

*Primary Examiner* — Ted Wang
(74) *Attorney, Agent, or Firm* — Eschweiler & Potashnik, LLC

(57) ABSTRACT

Devices are provided including an SFP interface and a further interface for wire-based data transmission. A conversion circuit converts between SFP interface signals and wire-based interface signals. The interfaces and the conversion circuit may be, but need not be, provided on a same circuit board.

18 Claims, 1 Drawing Sheet

DEVICE FOR DATA TRANSMISSION

TECHNICAL FIELD

The present application relates to a device for data transmission.

REFERENCE TO RELATED APPLICATIONS

This Application claims priority benefit of German Utility Model 20 2015 100 868.6 filed on Feb. 24, 2015. The entire content of the indicated prior Application is hereby incorporated by reference herein.

BACKGROUND

Fiber optics networks are increasingly used as transmission medium in the communication field and ensure a fast data transmission to the consumer over long distances. In these fiber optics networks, a number of fiber optic cable systems are combined to form one network. To date, the communication network has not yet been extended far enough so that in many cases the fiber optic cables do not run directly up to the consumer but only extend to a distributor. From the distributor, copper telephone cables already installed, e.g. of a conventional telephone system, or coaxial cables are used for the further transmission of data to and from the consumer. Due to the increased demand for bandwidth, the extension of the communication network and thus the installation of the fiber optic cables up to the consumer is required and is carried out in various stages of extension. The first stage of extension, FTTN (Fiber To The Node) comprises the installation of the fiber optic cables up to the distributor mentioned. The standard copper cables run from there to the consumer are then upgraded to fiber optic cables step by step.

Transmission methods generally designated by xDSL (Digital Subscriber Line) ensure high transmission rates via copper cables. Conventional xDSL transmission methods are, for example, ADSL, SHDSL and VDSL/VDSL2. At present, G.fast is being developed as successor. ADSL is a method provided especially for customer requirements in which a higher receiving rate (downstream) than transmitting rate (upstream) is desired by the consumer. In contrast, SHDSL is a symmetric transmission technology in which receiving rates and transmitting rates are equal. VDSL2 can be used for providing higher data rates in the FTTN systems mentioned above. By using VDSL2, a distributor network is set up in which a data transmission in the Mbit range is provided from the distributor to the consumer. G.fast is a wire-based transmission method that can similarly be used as successor of VDSL2.

In fiber optic transmission, the so-called SFP (Small Form-factor Pluggable) interface is frequently used. SFP modules can have optical transceivers which can be used for network connections and are applied in the optical domain. They are designed for very high data transmission rates in the Gbit range. Such SFP modules with optical transceivers provide, for example, a link between fiber optic cables and a network switch.

SUMMARY

One illustrative embodiment of the present application is related to a device which connects an SFP interface and a further interface which is designed for a wire-based data transmission. In some embodiments, this provides for a flexible connectivity of mobile back hauls, network devices such as routers and/or other consumer devices which have an SFP interface, to a wire-based network.

DESCRIPTION

In the text which follows, embodiments of the present invention are explained in detail by referring to the attached drawings. These embodiments only represent examples and should not be interpreted as being restrictive. Whereas, for example, the embodiments are described in such a manner that they comprise a multiplicity of features and elements, some of these features can be omitted in other embodiments and/or replaced by alternative features or elements. In other embodiments, additional or alternatively additional features or elements apart from those described explicitly can be provided. Variants or modifications which relate to one or more embodiments can also be applied to other embodiments unless specified otherwise.

Figure 1:
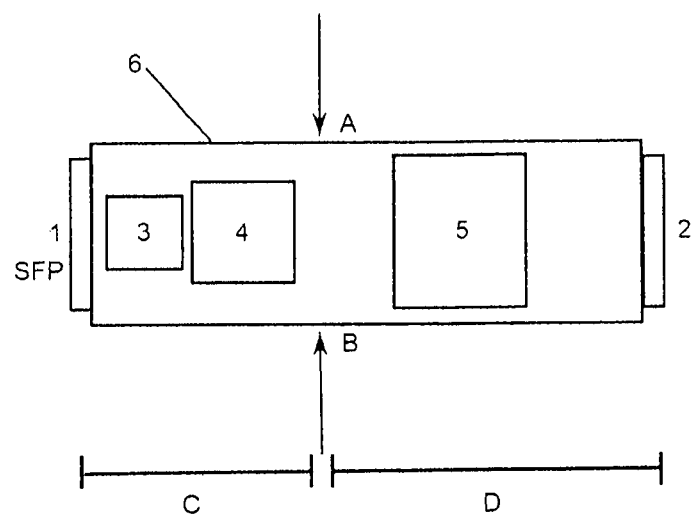
FIG. 1 shows a schematic representation of a device according to an illustrative embodiment.

FIG. 1 shows a device according to an illustrative embodiment. The device according to the illustrative embodiment in FIG. 1 comprises a first interface 1 which, in the illustrative embodiment shown, is arranged on a first side of the device, and a second interface 2 on a second side opposite to the first one, and a conversion circuit 3, 4, 5.

In the example shown, the interface 1 is a standardized SFP interface.

The interface 2, which is used for wire-based data transmission, can comprise, for example, an Ethernet interface and/or an xDSL interface which, for example, can be a VDSL2 interface or an SHDSL interface. Other xDSL types, e.g. ADSL, ADSL2 or VDSL, or also G.fast, are also possible. The Ethernet interface and the xDSL interface can be arranged in different layers according to the OSI model. The OSI model provides for communication of various systems by using a layered architecture. According to one illustrative embodiment of the device from FIG. 1, for example, the VDSL2 interface or the SHDSL interface can be allocated to the physical layer (Layer 1) whereas the Ethernet interface can be allocated to the data link layer (Layer 2). Thus, a VDSL2 communication or an SHDSL communication via Ethernet can take place in embodiments. In the case of other embodiments, VDSL2 or SHDSL can take place via telephone lines or other types of communications, e.g. another xDSL communication.

The conversion circuit 3, 4, 5 provides for the conversion of signals between the interface 1 and the further interface 2.

According to one illustrative embodiment in FIG. 1, the interface 1, the interface 2 and the conversion circuit are arranged on a single circuit board 6. Interface 1 can be used as input port and/or output port. Interface 2 can also be used as input port and/or output port.

The form of the device on one side, that is to say adjacent to the SFP interface, can be selected, according to the illustrative embodiment in FIG. 1, in such a manner that the one side, that is to say where the SFP interface forms the termination of the circuit board 6, can be inserted into an SFP plug-in location. Thus, starting from the SFP interface, the circuit board can be so narrow, at least up to positions A and B in FIG. 1, that the area identified by C in FIG. 1 has a corresponding width for SFP plug-in locations. The area identified by D in FIG. 1 can have a different width.

The circuit board can be provided with a corresponding housing which corresponds to the shape of the circuit board.

The conversion circuit of the device comprises in one illustrative embodiment conventional semiconductor components with associated analog circuitry. Using conventional components can lead to a reduction in costs since no new components need to be manufactured. In addition, it simplifies the production of the circuit board.

The conversion circuit as shown in FIG. 1 comprises a conventional SGMII interface, as identified by 3 in FIG. 1, a conventional xDSL chip as identified by 4 in FIG. 1, and an associated conventional xDSL memory as identified by 5 in FIG. 1. The device also comprises a conventional analog circuitry.

Figure 2:
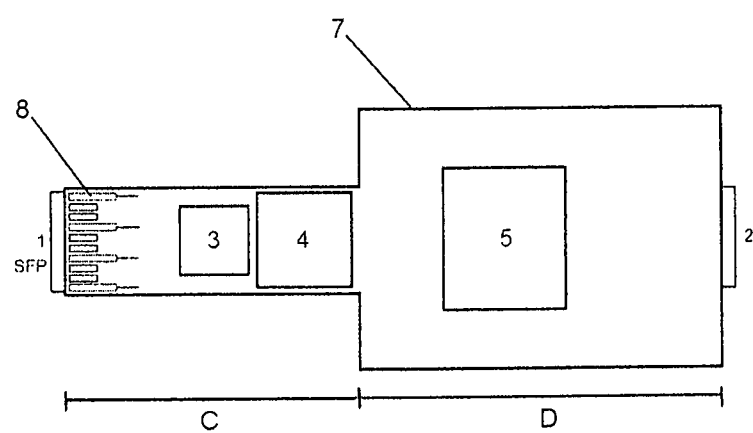
FIG. 2 shows a schematic representation of a device according to a further illustrative embodiment.

FIG. 2 shows a device according to a further illustrative embodiment. Reference symbols from FIG. 1 are partially also used in FIG. 2 and relate to mutually corresponding elements of the device. In the illustrative embodiment of FIG. 2, the circuit board 7 has a type of "key shape" with a narrower area C on the side of the SFP interface and a wider area D on the side of the second interface.

In addition, the SFP interface, according to the illustrative embodiment in FIG. 2, comprises corresponding conductor tracks 8 on the circuit board which form a male connector.

The device according to the illustrative embodiment in FIG. 1 and/or FIG. 2 can be used for coupling a wire-based network to network devices, for example routers. According to the illustrative embodiment in FIG. 2, the device can be used in a router, providing for an optical link, and an xDSL link being provided for by exchanging cards.

What is claimed is:

1. A device, comprising:
    an SFP interface, and
    a wire-based interface for wire-based data transmission, the wire-based interface comprising:
        an Ethernet interface; and
        a digital subscriber line (DSL) interface;
        wherein the Ethernet interface is allocated to a data link layer and the DSL interface is allocated to a physical layer; and
    a conversion circuit for converting signals between an SFP interface and the wire-based interface.

2. The device according to claim 1, the DSL interface comprising an xDSL interface.

3. The device according to claim 2, wherein xDSL is one of VDSL2, SHDSL or G.fast.

4. The device according to claim 1, the interfaces and the conversion circuit being arranged on a single circuit board.

5. The device according to claim 4, the shape of the device adjacently to the SFP interface being selected in such a manner that it can be inserted into an SFP plug-in location.

6. The device according to claim 5, the device being arranged in a corresponding housing.

7. The device according to claim 1, the conversion circuit comprising conventional semiconductor components.

8. The device according to claim 1, the conversion circuit comprising an SGMII interface circuit which provides signals for the SFP interface.

9. The device according to claim 1, the conversion circuit comprising an xDSL chip.

10. The device according to claim 9, the conversion circuit comprising a memory for the xDSL chip.

11. The device according to claim 9, xDSL being VDSL2, SHDSL or G.fast.

12. The device according to claim 1, the SFP interface comprising conductor tracks on a circuit board which form a male connector.

13. The device according to claim 4, wherein the circuit board has a smaller width at the SFP interface than at the wire-based interface.

14. A device, comprising:
    a printed circuit board having a relatively smaller width portion and a relatively larger width portion,
    an SFP interface arranged on the circuit board at the relatively smaller width portion, and
    a wire-based interface arranged on the circuit board at the relatively lager width portion for wire-based data transmission, the wire-based interface comprising:
        an Ethernet interface; and
        a digital subscriber line (DSL) interface; wherein the Ethernet interface is allocated to a data link layer and the DSL interface is allocated to a physical layer; and
    a conversion circuit for converting signals arranged on the circuit board between an SFP interface and the wire-based interface.

15. The device according to claim 14, the interface comprising an xDSL interface.

16. The device according to claim 14, the circuit board being a single circuit board.

17. The device according to claim 14, the width of the relatively smaller width portion being such that it can be inserted into an SFP plug-in location.

18. The device according to claim 14, the SFP interface comprising conductor tracks on the circuit board which form a male SFP connector.

* * * * *